US012485695B2

(12) United States Patent
Abe et al.

(10) Patent No.: US 12,485,695 B2
(45) Date of Patent: Dec. 2, 2025

(54) DRAWING DEVICE

(71) Applicant: BROTHER KOGYO KABUSHIKI KAISHA, Nagoya (JP)

(72) Inventors: Daisuke Abe, Nagoya (JP); Hiroki Mori, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 756 days.

(21) Appl. No.: 17/940,713

(22) Filed: Sep. 8, 2022

(65) Prior Publication Data

US 2023/0001706 A1 Jan. 5, 2023

Related U.S. Application Data

(63) Continuation of application No. PCT/JP2021/005205, filed on Feb. 12, 2021.

(51) Int. Cl.
*B43L 13/02* (2006.01)
*B41J 2/49* (2006.01)

(52) U.S. Cl.
CPC ............... *B43L 13/024* (2013.01); *B41J 2/49* (2013.01)

(58) Field of Classification Search
CPC .................................. B43L 13/024; B41J 2/49
See application file for complete search history.

(56) References Cited

U.S. PATENT DOCUMENTS 6,425,185 B1 * 7/2002 Regnault ................. B43L 13/10 33/18.2
9,894,976 B2 * 2/2018 Shimizu ................. A45D 29/00
9,894,978 B2 * 2/2018 Nagao .................. A45D 34/041
10,796,210 B2 * 10/2020 Hasegawa .......... G06K 15/4075
11,298,850 B2 * 4/2022 Sugiyama ............. B26D 5/083
(Continued)

FOREIGN PATENT DOCUMENTS

JP S5926395 U 2/1984
JP S6391297 A 4/1988
(Continued)

OTHER PUBLICATIONS

International Search Report of corresponding PCT application PCT/JP2021/005205, dated Apr. 20, 2021.
(Continued)

*Primary Examiner* — Yaritza Guadalupe-McCall
(74) *Attorney, Agent, or Firm* — K&L Gates LLP

(57) ABSTRACT

A drawing device for drawing an object on a workpiece using a pen includes a holder, a movement portion to move the holder, a rotation portion to rotate the holder, and a memory storing, for each of a plurality of line segments configuring the object, drawing data relating to a position and a length of the line segment, and angle data relating to a rotation angle of the holder. The drawing device acquires the drawing data and the angle data of a preceding line segment from the memory, rotates the rotation portion in accordance with the angle data, and draws the object by controlling the movement portion in accordance with the drawing data. The drawing device acquires the drawing data and the angle data of a subsequent line segment continuously subsequent to the preceding line segment, rotates, and draws the object in the same manner as the preceding line segment.

9 Claims, 13 Drawing Sheets

(56) References Cited

U.S. PATENT DOCUMENTS

| | | | | |
|---|---|---|---|---|
| 11,389,983 | B2 * | 7/2022 | Sugiyama | B26D 5/00 |
| 11,571,924 | B2 * | 2/2023 | Mori | B05C 1/00 |
| 11,772,292 | B2 * | 10/2023 | Yamada | B43L 13/00<br>700/275 |
| 11,904,489 | B2 * | 2/2024 | Sugiyama | B26D 5/20 |
| 11,986,971 | B2 * | 5/2024 | Sugiyama | B26D 5/06 |
| 12,151,389 | B2 * | 11/2024 | Sugiyama | B26D 5/00 |
| 12,397,461 | B2 * | 8/2025 | Torii | B26D 5/06 |
| 2009/0255137 | A1 * | 10/2009 | Apkarian | B44B 3/009<br>33/23.01 |
| 2013/0199430 | A1 * | 8/2013 | Kato | D05B 37/00<br>112/470.05 |
| 2013/0255458 | A1 * | 10/2013 | Kawase | B26D 5/005<br>83/76.1 |
| 2018/0297392 | A1 * | 10/2018 | Caberwal | B43L 13/026 |
| 2019/0193420 | A1 * | 6/2019 | Hasegawa | G06K 15/1823 |
| 2021/0339419 | A1 * | 11/2021 | Mori | B26D 5/00 |
| 2021/0339560 | A1 * | 11/2021 | Yamada | G06T 3/60 |
| 2023/0001706 | A1 * | 1/2023 | Abe | B43L 13/024 |
| 2024/0408817 | A1 * | 12/2024 | Mestrom | B33Y 50/02 |
| 2025/0108534 | A1 * | 4/2025 | Watanabe | B26D 7/2614 |

FOREIGN PATENT DOCUMENTS

| | | | |
|---|---|---|---|
| JP | S63145099 | A | 6/1988 |
| JP | H0180496 | U | 5/1989 |
| JP | H0231796 | U | 2/1990 |
| JP | H0390397 | A | 4/1991 |
| JP | H0396399 | A | 4/1991 |
| JP | 2018024155 | A | 2/2018 |

OTHER PUBLICATIONS

International Preliminary Report on Patentability for corresponding PCT application PCT/JP2021/005205, dated Sep. 20, 2022.

Written Opinion for corresponding PCT application PPCT/JP2021/005205, dated Apr. 20, 2021.

* cited by examiner

FIG. 4

| | | | | |
|---|---|---|---|---|
| TYPE DATA | OBJECT TYPE | | | CHARACTER |
| | FONT TYPE | | | ITALIC |
| | OBJECT CODE | | | A |
| LINE SEGMENT NUMBER DATA | | | | 4 |
| LINE SEGMENT L1 DATA | ANGLE DATA | ROTATIONAL DIRECTION | | RIGHT |
| | | START ANGLE POSITION | | 45 |
| | | END ANGLE POSITION | | 45 |
| | DRAWING DATA | VERTICAL POSITION | | DOWN |
| | | START COORDINATES | X | 0 |
| | | | Y | 0 |
| | | END ANGLE POSITION | X | 10 |
| | | | Y | 20 |
| LINE SEGMENT L2 DATA | ANGLE DATA | ROTATIONAL DIRECTION | | RIGHT |
| | | START ANGLE POSITION | | 45 |
| | | END ANGLE POSITION | | 45 |
| | DRAWING DATA | VERTICAL POSITION | | DOWN |
| | | START COORDINATES | X | 10 |
| | | | Y | 20 |
| | | END ANGLE POSITION | X | 20 |
| | | | Y | 0 |
| LINE SEGMENT L3 DATA | ANGLE DATA | ROTATIONAL DIRECTION | | RIGHT |
| | | START ANGLE POSITION | | 45 |
| | | END ANGLE POSITION | | 45 |
| | DRAWING DATA | VERTICAL POSITION | | UP |
| | | START COORDINATES | X | 20 |
| | | | Y | 0 |
| | | END ANGLE POSITION | X | 3 |
| | | | Y | 5 |
| LINE SEGMENT L4 DATA | ANGLE DATA | ROTATIONAL DIRECTION | | RIGHT |
| | | START ANGLE POSITION | | 90 |
| | | END ANGLE POSITION | | 90 |
| | DRAWING DATA | VERTICAL POSITION | | DOWN |
| | | START COORDINATES | X | 3 |
| | | | Y | 5 |
| | | END ANGLE POSITION | X | 17 |
| | | | Y | 5 |

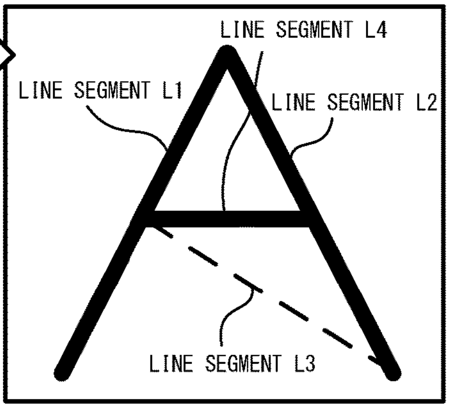

DRAWING DEVICE

REFERENCE TO RELATED APPLICATIONS

This application is a Continuation Application of International Application No. PCT/JP2021/005205, filed on Feb. 12, 2021, which claims priority from Japanese Patent Application No. 2020-048896, filed on Mar. 19, 2020. This disclosure of the foregoing application is hereby incorporated by reference in its entirety.

BACKGROUND ART

The present disclosure relates to a drawing device that draws a character, symbol, or pattern (hereinafter referred to as an object) on a workpiece.

A drawing device is known that draws an object on a sheet-shaped workpiece. The known drawing device includes a rotatable italic nib pen holder, a holding device of a sheet to be drawn on, and a drive control device that causes relative positions of both the pen holder and the holding device to be displaced in an XY direction. This drawing device detects a movement vector in the XY direction, and controls a drawing angle of the italic nib pen in that direction, and performs control such that a drawing line width becomes a value that is set in advance.

DESCRIPTION

Since the drawing line width is a constant pre-set value, the above-described drawing device cannot change the line width at a desired position in the object. Thus, there is a problem in that a power of expression of an appearance of the object is poor.

In light of the foregoing problem, an object of the present disclosure is to provide a drawing device that automatically changes a line width of a line segment while drawing a single object.

A drawing device, for drawing an object on a workpiece using a pen, according to the present disclosure includes a holder, a first movement portion, a rotation portion, a processor, and a memory. The holder is configured to hold the pen. The first movement portion is configured to move the holder and the workpiece relative to each other in an X direction and a Y direction. The X direction and the Y direction are mutually orthogonal. The rotation portion is configured to rotate the holder around a rotational axis parallel to a Z direction orthogonal to the X direction and the Y direction. The memory stores drawing data and angle data for each of a plurality of line segments configuring the object. The drawing data relates to a position of the line segment and to a length of the line segment. The angle data relates to a rotation angle of the holder. The rotation angle corresponds to a line width of the line segment. The memory stores computer-readable instructions that, when executed by the processor, cause the processor to perform processes. The processes comprising first acquiring, first rotating, first drawing, second acquiring, second rotating, and second drawing. The first acquiring acquires, from the memory, the drawing data and the angle data of a preceding line segment. The first rotating rotates the rotation portion, in accordance with the angle data of the preceding line segment acquired by the first acquiring. The first drawing controls the first movement portion to draw on the workpiece using the pen, in accordance with the drawing data of the preceding line segment acquired by the first acquiring. The second acquiring acquires, from the memory, the drawing data and angle data of a subsequent line segment continuously subsequent to the preceding line segment. The second rotating rotates the rotation portion in accordance with the angle data of the subsequent line segment acquired by the second acquiring. The second drawing controls the first movement portion to draw on the workpiece using the pen, in accordance with the drawing data of the subsequent line segment acquired by the second acquiring.

According to the above-described drawing device, since the rotation portion rotates the holder in accordance with the angle data of the line segment, the pen held by the holder can perform the rotation per line segment while drawing the single object. In other words, compared to a case in which the pen is not rotated while drawing the single object, the line width of the drawn object changes per line segment, and a power of expression of the drawn object is improved.

FIG. 4 is a diagram showing a data table.

EMBODIMENTS

Figure 1:
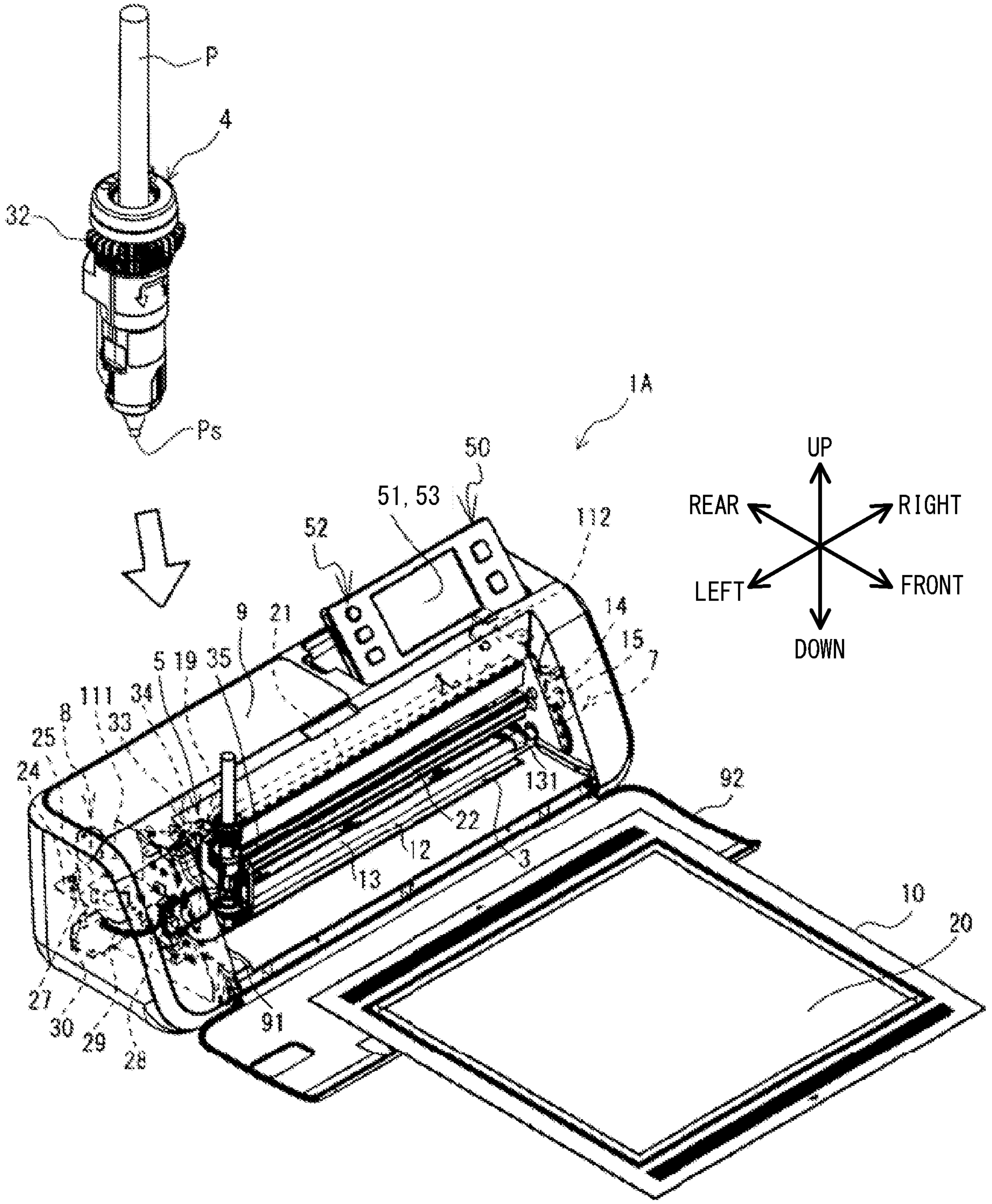
FIG. 1 is a perspective view of a drawing device.

Hereinafter, a drawing device 1A that is an embodiment of the present disclosure will be described with reference to the drawings.

Mechanical Configuration of Drawing Device 1A

The mechanical configuration of the drawing device 1A will be described with reference to FIG. 1. The drawing device 1A is used in a state in which a cartridge 4 to which the pen P can be fixed is mounted to the drawing device 1A. The drawing device 1A can draw an object on a sheet-shaped workpiece 20 using the pen P. The workpiece 20 is, for example, paper, fabric, a plastic sheet, or a metal sheet. When the object is to be drawn using calligraphy, in the pen P that is used, a cross-sectional shape in the horizontal direction of a pen tip Ps includes an oval shape, a rectangular shape, a square shape, a polygonal shape, or an anisotropic shape, such as a star shape, or the like. Note that, in the present embodiment, the up-down direction, the front-rear direction, and the left-right direction indicate directions shown by arrows in FIG. 1, taking a line of sight of a user viewing the drawing device 1A from the front as a reference.

The drawing device 1A is provided with a main body cover 9, a holder 10, a platen 3, a conveyance portion 7, a head 5, a movement portion 8, and an operation portion 50.

The main body cover 9 is a rectangular cuboid housing that is long in the left-right direction. An opening 91, a cover 92, and the operation portion 50 are provided at the main body cover 9. The opening 91 is an opening provided in a front surface portion of the main body cover 9. The cover 92 is a plate-shaped member that is long in the left-right direction. The lower end of the cover 92 is rotatably supported by the main body cover 9. FIG. 1 shows a state in which the cover 92 is open and the opening 91 is open.

The holder 10 is a rectangular mat. An adhesive is applied to the upper surface of the holder 10 so as to hold the workpiece 20.

The platen 3 is provided inside the main body cover 9. The platen 3 receives the lower surface of the holder 10, the holder 10 holding the workpiece 20 can be placed thereon. The holder 10 is placed on the platen 3 in the state in which the opening 91 is open.

The conveyance portion 7 is configured to be able to convey the holder 10 set on the platen 3, in the front-rear direction (hereinafter also referred to as a Y direction) of the drawing device 1A. In other words, the conveyance portion 7 conveys the workpiece 20 held by the holder 10, in the front-rear direction. The conveyance portion 7 is provided with a drive roller 12, a pinch roller 13, an attachment frame 14, and a Y-axis motor 15. A pair of side wall portions 111 and 112 are disposed so as to face each other inside the main body cover 9. The side wall portion 111 is positioned to the left of the platen 3. The side wall portion 112 is positioned to the right of the platen 3. The drive roller 12 and the pinch roller 13 are rotatably supported between the side wall portions 111 and 112. The drive roller 12 and the pinch roller 13 extends in the left-right direction (hereinafter also referred to as an X direction) of the drawing device 1A, and are disposed so as to be aligned with each other in the up-down direction. A roller portion that is not shown in the drawings is disposed at a left portion of the pinch roller 13, and a roller portion 131 is disposed at a right portion of the pinch roller 13. The attachment frame 14 is fixed to the right surface of the side wall portion 112. The Y-axis motor 15 is fixed to the attachment frame 14. A drive gear that is not shown in the drawings is fixed to an output shaft of the Y-axis motor 15. The drive gear meshes with a driven gear fixed to a leading end of a right end portion of the drive roller 12.

Figure 2:
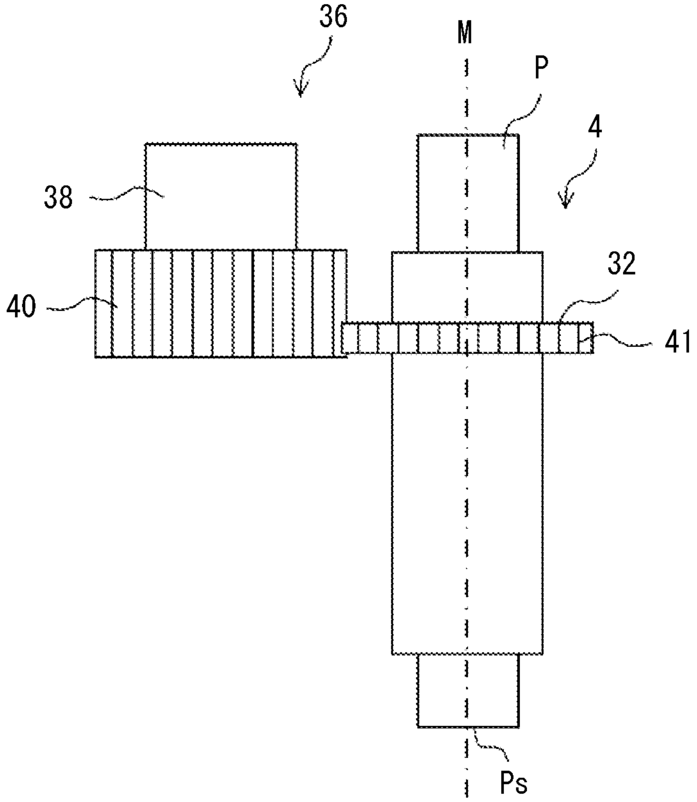
FIG. 2 is an explanatory diagram showing an arrangement relationship between a rotation portion, a cartridge, and a pen.

The head 5 is provided with a carriage 19, an up-down drive portion 33, and a rotation portion 36 shown in FIG. 2. A mount recess 35 is formed in the carriage 19. A mount portion 32 of the cartridge 4 is configured to be able to hold the pen P such that the pen tip Ps of the pen P is disposed at a lower end thereof. The up-down drive portion 33 is provided with a Z-axis motor 34. The Z-axis motor 34 is coupled to the mount portion 32 such that the mount portion 32 and the cartridge 4 are moved in the up-down direction by the rotation of the Z-axis motor 34. The rotation portion 36 is provided with a rotation motor 38, as shown in FIG. 2. In a state in which the mount portion 32 of the cartridge 4 is mounted to the mount recess 35, a gear 40 coupled to the rotation motor 38 meshes with a gear 41 of the mount portion 32. In other words, the rotation motor 38 is coupled to the mount portion 32 such that the mount portion 32 and the cartridge 4 are rotated by the rotation of the rotation motor 38, a rotational axis thereof being a center line M, which is parallel to the up-down direction, of the cartridge 4. In the rotation portion 36, a basic mechanical configuration that couples the rotation motor 38 and the mount portion 32 is a known configuration and an explanation thereof is thus omitted.

The movement portion 8 is configured to be able to move the head 5 in the X direction that is the left-right direction. The movement portion 8 is provided with an upper and lower pair of guide rails 21 and 22, an attachment frame 24, an X-axis motor 25, a drive gear 27, a driven gear 29, and a transmission mechanism 30. The guide rails 21 and 22 are fixed between the side wall portions 111 and 112. The guide rails 21 and 22 are positioned to the rear and above the pinch roller 13. The guide rails 21 and 22 are disposed in parallel to the pinch roller 13 and extend in the left-right direction. The carriage 19 of the head 5 is supported by the guide rails 21 and 22 so as to be able to move in the X direction along the guide rails 21 and 22. The attachment frame 24 is fixed to the left surface of the side wall portion 111. The X-axis motor 25 is attached, so as to be oriented downward, to the rear of the attachment frame 24. The drive gear 27 is fixed to an output shaft of the X-axis motor 25. The driven gear 29 meshes with the drive gear 27. The transmission mechanism 30 is provided with a left and right pair of timing pulleys that are not shown in the drawings, and a timing belt. A timing pulley 28 that is one of the left and right pair of timing pulleys, is fixed to the attachment frame 24 so as to be able to rotate integrally with the driven gear 29. The other of the timing pulleys that is not shown in the drawings is supported by the attachment frame 14. The timing belt that is not shown in the drawings has an endless belt shape that is stretched over the right and left pair of timing pulleys, and extends in the X direction. The timing belt is coupled to the carriage 19.

The operation portion 50 is provided with a liquid crystal display (LCD) 51, a plurality of operation switches 52, and a touch panel 53. The touch panel 53 is disposed at the surface of the LCD 51.

Electrical Configuration of Drawing Device 1A

Figure 3:
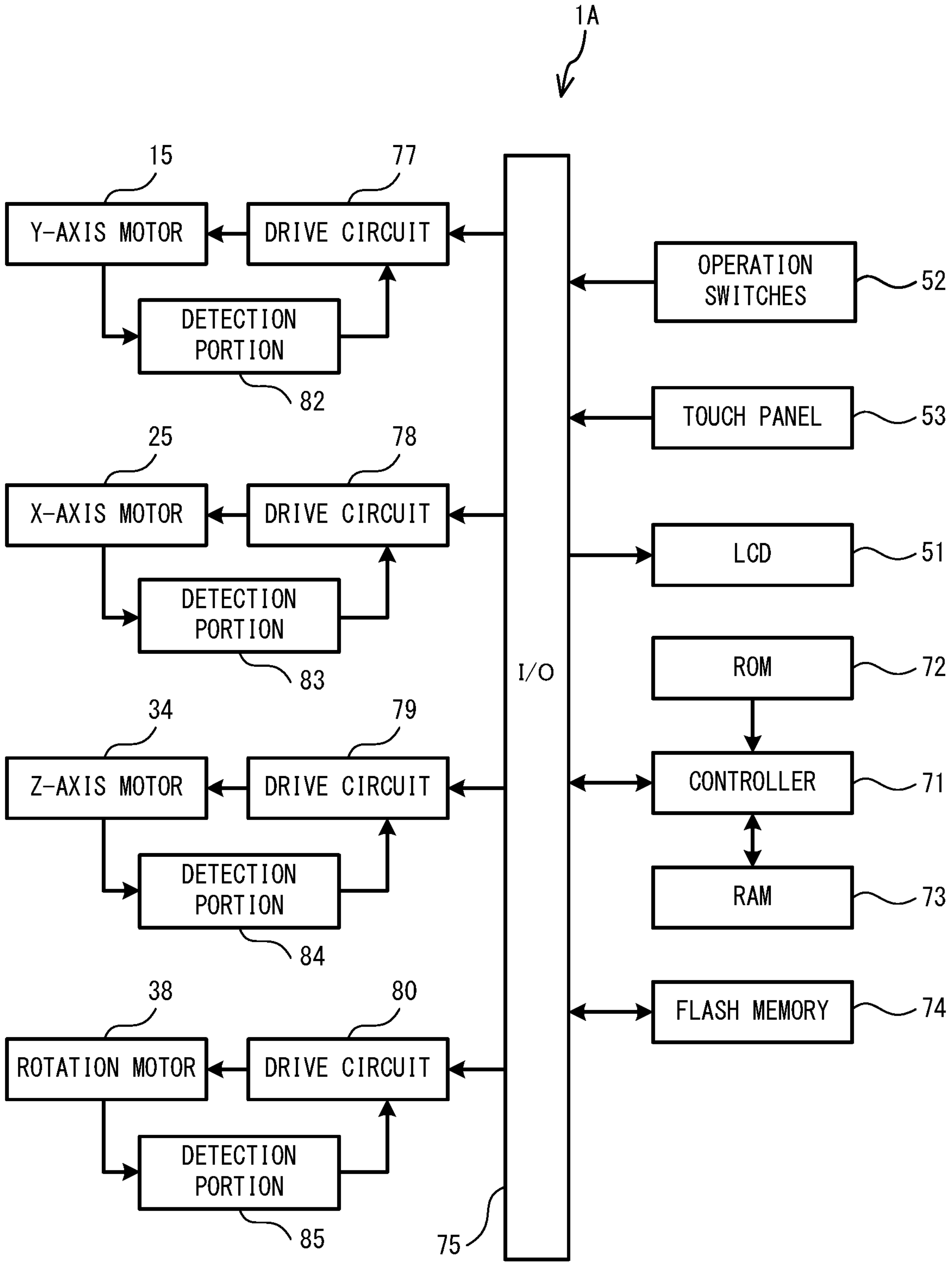
FIG. 3 is a block diagram showing an electrical configuration of the drawing device.

The electrical configuration of the drawing device 1A will be described with reference to FIG. 3. The drawing device 1A is provided with a controller 71, a ROM 72, a RAM 73, and an input/output (I/O) interface 75. The controller 71 is electrically connected to the ROM 72, the RAM 73, and the I/O interface 75. The ROM 72 stores programs relating to drawing modes for drawing on the workpiece 20 using the drawing device 1A, and cutting modes for cutting the workpiece 20 using the drawing device 1A. The RAM 73 temporarily stores arithmetic results and the like resulting from calculation processing by the controller 71.

A flash memory 74, the operation switches 52, the touch panel 53, the LCD 51, and drive circuits 77 to 80 are connected to the I/O interface 75. The flash memory 74 is a non-volatile storage element that stores various parameters, a data table 740 to be described later, and the like. The drive circuits 77 to 80 respectively drive the Y-axis motor 15, the X-axis motor 25, the Z-axis motor 34, and the rotation motor 38. The conveyance portion 7, the movement portion 8, the up-down drive portion 33, and the rotation portion 36 are respectively operated by the driving of each of these motors.

Images including various items, such as commands, illustrations, setting value, messages, and the like, are displayed on the LCD 51. Software buttons are displayed on the LCD 51 with which it is possible to select the character, symbol, or pattern, set various parameters, perform inputs, and the like. The touch panel 53 detects a pressed position that is pressed by one of a finger of the user or a stylus pen. In accordance with the pressed position detected by the touch panel 53, the controller 71 recognizes which of the items is to be selected or not.

A detection portion 82 is connected to the Y-axis motor 15 and the drive circuit 77. The detection portion 82 detects a conveyance position of the workpiece 20 and the holder 10 that are conveyed in the Y direction, which is the front-rear direction, by the driving of the Y-axis motor 15 by the conveyance portion 7. An origin position that is set in advance is prescribed to be zero, and the conveyance position is represented by an absolute value that is a distance from that origin point. The drive circuit 77 drives the Y-axis motor 15 in accordance with a conveyance position command from the controller 71, and a detection signal from the detection portion 82.

A detection portion 83 is connected to the X-axis motor 25 and the drive circuit 78. The detection portion 83 detects a movement position of the cartridge 4 and the head 5 that are conveyed in the X direction, which is the left-right direction, by the driving of the X-axis motor 25 by the movement portion 8. An origin position that is set in advance is prescribed to be zero, and the movement position is represented by an absolute value that is a distance from that origin point. The drive circuit 78 drives the X-axis motor 25 in accordance with a movement position command from the controller 71, and a detection signal from the detection portion 83.

A detection portion 84 is connected to the Z-axis motor 34 and the drive circuit 79. The detection portion 84 detects that the carriage 19 and the cartridge 4 are moved to a lowered position or a raised position by the driving of the Z-axis motor 34. The lowered position is a position at which the pen P held by the cartridge 4 and the workpiece 20 are in contact with each other. The raised position is a position at which the pen P held by the cartridge 4 and the workpiece 20 are separated from each other. The drive circuit 79 drives the Z-axis motor 34 in accordance with a lowered/raised position command from the controller 71, and a detection signal from the detection portion 84.

A detection portion 85 is connected to the rotation motor 38 and the drive circuit 80. The detection portion 85 detects a rotation angle position to which the cartridge 4 is rotated by the driving of the rotation motor 38, where the rotational axis thereof is the center line M, which is parallel to the up-down direction, of the cartridge 4. An origin position that is set in advance is prescribed to be zero degrees, and the rotation angle position is represented by an absolute value that is a rotation angle rotated from that origin position. The drive circuit 80 drives the rotation motor 38 in accordance with a rotation angle position command from the controller 71, and a detection signal from the detection portion 85.

Data Table 740

A plurality of data tables are stored in the flash memory 74. Of the plurality of data tables, the data table 740 shown in FIG. 4 will be described as an example. The data table 740 includes object IDs, type data, line segment number data, and line segment data.

The type data is data indicating an object type, a font type, and an object code. The object type indicates whether the object to be drawn is a character, a symbol, or a pattern. The font type indicates a font of the character, only when the object type is the character. When the object type is the type other than the character, a code is stored, as the font type, indicating that the font is not to be specified. The object code indicates a code representing each of the objects. When the object type is the character, as the object code, a code is stored in the data table representing each of the characters in the hiragana alphabet, the katakana alphabet, numerals, the roman alphabet, and the like. The data table 740 indicates stored content when the object type, the font type, and the object code are respectively set to “Character,” “Italic,” and “A.” As the object code in the data table 740 shown in FIG. 4, a code representing the character “A” is essentially stored, but, for the ease of explanation, this is indicated by “A.”

The line segment number data indicates the number of line segments included in the object. In the data table 740, the line segment number data indicates that the character “A” includes four line segments L1 to L4.

The line segment data is set for each of the line segments included in the object. The line segment data include angle data and drawing data.

The angle data is data representing a rotation direction, a start angle position, and an end angle position. The rotation direction indicates whether to rotate the cartridge 4 and the pen P in a rightward rotation (a clockwise rotation) or in a leftward rotation (a counter-clockwise rotation), when the workpiece 20 is viewed from above the carriage 19 and the cartridge 4 in FIG. 1. In the data table 740 shown in FIG. 4, for ease of explanation, the clockwise rotation is indicated by “Right” and the counter-clockwise rotation is indicated by “Left,” respectively. The start angle position indicates a rotation angle position of the cartridge 4 and the pen P at a start point of a line segment when the origin point is zero degrees. The end angle position indicates the rotation angle position of the cartridge 4 and the pen P at an end point of the line segment when the origin point is zero degrees.

The drawing data is data representing a vertical position, start coordinates, and end coordinates. The vertical position indicates whether the pen P has been moved to the raised position, or whether the pen P has been moved to the lowered position. In the data table 740 shown in FIG. 4, for ease of explanation, the raised position is indicated by “Up” and the lowered position is indicated by “Down,” respectively. The start coordinates indicate an X coordinate and a Y coordinate of a point at which the drawing of the line segment starts. The end coordinates indicate an X coordinate and a Y coordinate of a point at which the drawing of the line segment ends. In FIG. 1, an origin point of the coordinate system is a point to the front left of a region on which the drawing is possible. The X coordinates and the Y coordinates represent absolute coordinates in the coordinate system. The controller 71 controls the conveyance portion 7 and the movement portion 8 using the start coordinates and the end coordinates, and the holder 10 and the head 5 are positioned taking the origin point as the reference.

Operations of Drawing Device 1A

Figure 6:
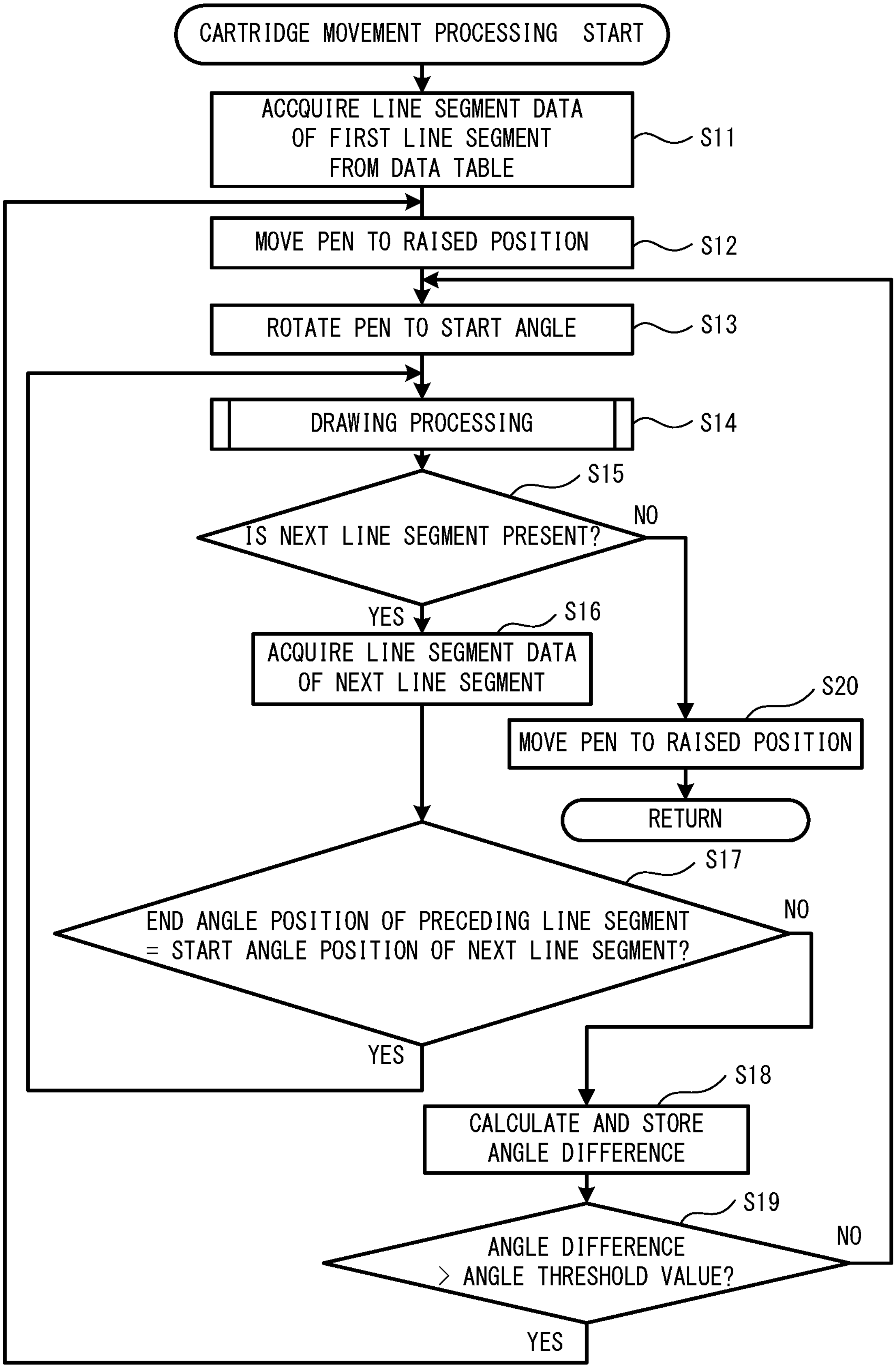
FIG. 6 is a flowchart of cartridge movement processing.
Figure 7:
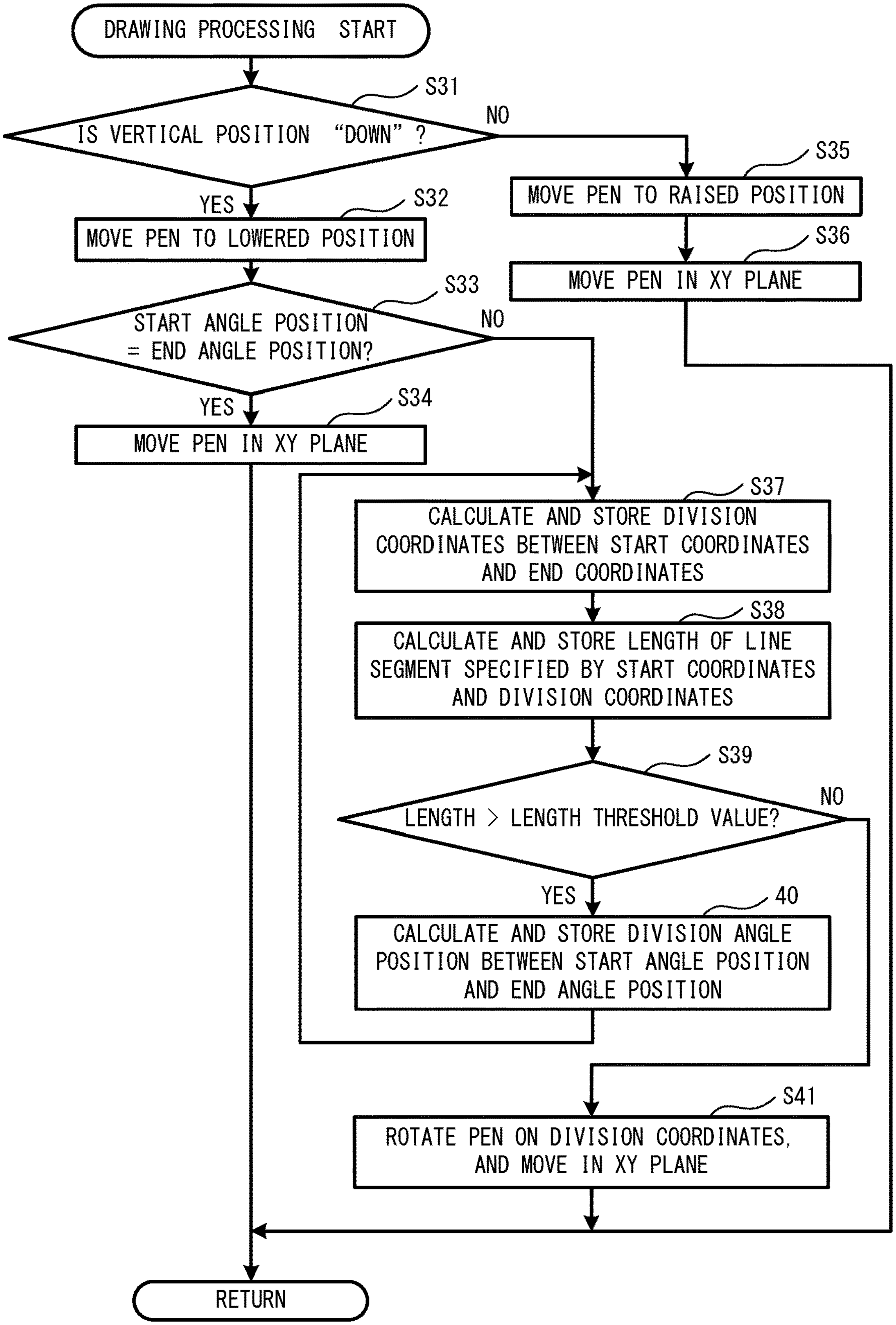
FIG. 7 is a flowchart of drawing processing.

Operations by which the drawing device 1A draws the object on the workpiece 20 will be described with reference to FIG. 4 to FIG. 13. When a power supply to the drawing device 1A is turned on, a main program that is not shown in the drawings is read out from the ROM 72 and executed. When the main program is executed, the drawing device 1A enters into a state of being able to receive selection of an operation mode, and the software button for selecting a drawing mode is displayed on the LCD 51. Drawing mode processing shown in FIG. 5 starts when the user presses the software button that selects the drawing mode. When the software button that selects the drawing mode is pressed, the controller 71 reads out and executes a drawing mode processing program, which is stored in the ROM 72. Note that the processing at each of steps (hereinafter abbreviated as S) shown in FIG. 5 to FIG. 7 is performed by the controller 71.

Drawing Mode Processing

The drawing mode processing will be described with reference to FIG. 5. When the drawing mode processing is started, the controller 71 displays, on the LCD 51, a plurality of software buttons respectively corresponding to a plurality of the objects. By operating the touch panel 53, the user selects the software buttons respectively specifying “Character” as the object type, “Italic” as the font type, and “A” corresponding to the object code, as shown in FIG. 4.

Figure 5:
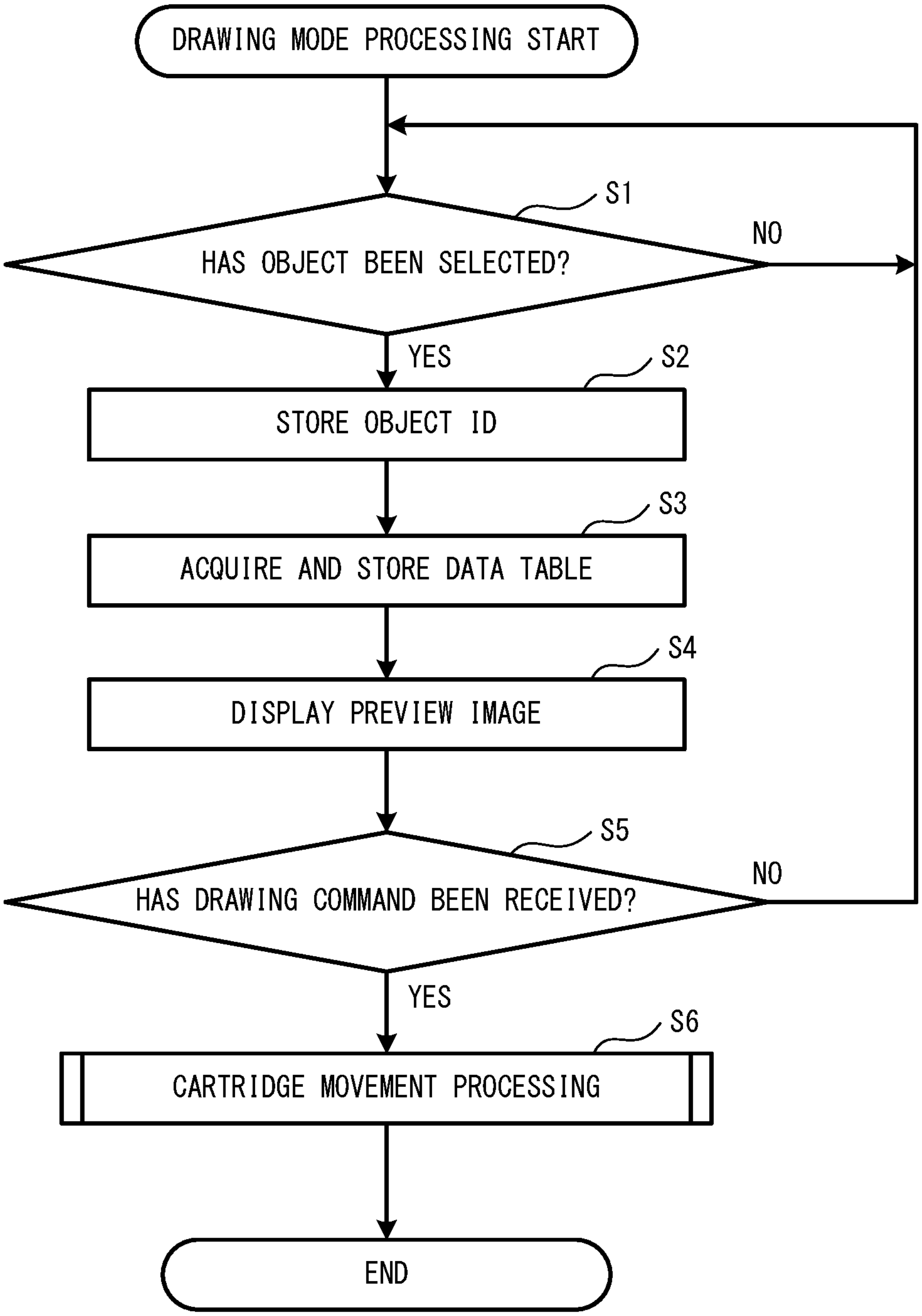
FIG. 5 is a flowchart of drawing mode processing.

As shown in FIG. 5, the controller 71 determines whether or not the software button of the object displayed on the LCD 51 has been selected (S1). When it is determined that the software button of the object has not been selected (no at S1), the controller 71 returns the processing to S1.

When it is determined that the software button of the object has been selected (yes at S1), the controller 71 stores, in the RAM 73, the ID of the object corresponding to the selected software button (S2).

When the ID of the object is stored, from among the plurality of data tables stored in the flash memory 74, the controller 71 acquires the data table 740 corresponding to the stored ID of the object, and stores the acquired data table 740 in the RAM 73 (S3).

When the data table 740 is stored, the controller 71 displays, on the LCD 51, a relative position of the selected object with respect to the workpiece 20, as a preview image (S4). At the same time as displaying the preview image of the relative position, the controller 71 displays, on the LCD 51, a software button for starting the drawing of the object. When causing the drawing of the preview image displayed on the LCD 51 to be performed, the user presses the drawing start software button.

When the preview image and the drawing start software button are displayed, the controller 71 determines whether or not the drawing start software button has been pressed within a predetermined time period (S5). When it is determined that the drawing start software button has not been pressed within the predetermined time period (no at S5), the controller 71 returns the processing to S1.

When it is determined that the drawing start software button has been pressed (yes at S5), the controller 71 performs cartridge movement processing (S6) to be described later, and causes the selected object to be drawn on the workpiece 20.

When the cartridge movement processing (S6) is complete, the drawing mode processing ends.

Cartridge Movement Processing

The cartridge movement processing will be described in detail with reference to FIG. 6. When the cartridge movement processing is started, the controller 71 acquires, from the data table 740 stored in the RAM 73, line segment data of the line segment L1 to be drawn first (S11).

When the line segment data is acquired, the controller 71 drives the Z-axis motor 34 and moves the mount portion 32, the cartridge 4, and the pen P to the raised position (S12).

When the mount portion 32, the cartridge 4, and the pen P are moved to the raised position, the controller 71 drives the rotation motor 38 and rotates the cartridge 4 and the pen P such that the pen P is disposed at the start angle position of 45° in the line segment data of the line segment L1 (S13). When rotating the pen P, the pen P is rotated in the rightward rotation, which is the rotation direction specified by the line segment data of the line segment L1, and the pen P is disposed at the start angle position.

When the pen P is disposed at the start angle position of the line segment L1, the controller 71 performs drawing processing to be described later (S14).

When the drawing processing is complete, the controller 71 determines whether or not the line segment data of the line segment L2 to be drawn next is present in the data table 740 stored in the RAM 73 (S15).

When it is determined that the line segment data of the line segment L2 to be drawn next is present (yes at S15), the controller 71 acquires, from the data table 740 stored in the RAM 73, the next line segment data of the line segment L2 (step S16).

When the next line segment data of the line segment L2 is acquired, the controller 71 determines whether or not the end angle position of 45° in the line segment data of the preceding line segment L1 and the start angle position of 45° in the line segment data of the next line segment L2 match each other (step S17).

When it is determined that the end angle position of the preceding line segment L1 and the start angle position of the next line segment L2 match each other (yes at S17), the controller 71 performs the drawing processing, to be described later, such that the next line segment L2 is drawn (step S14).

When it is determined that the end angle position of the preceding line segment and the start angle position of the next line segment do not match each other (no at S17), the controller 71 calculates an angle difference between the end angle position of the preceding line segment and the start angle position of the next line segment, and stores the calculated angle difference in the RAM 73 (step S18). Here, the angle difference will also be referred to as an angle value. In FIG. 4, when the preceding line segment is the line segment L3, the end angle position of the preceding line segment L3 is the rightward rotation of 45°, and the start angle position of the next line segment L4 is the rightward rotation of 90°, and thus, the angle difference is calculated to be the rightward rotation of 45°.

When the angle difference is stored, the controller 71 determines whether or not the angle difference is larger than a preset angle threshold value (step S19). The angle threshold value is set such that, when the pen P is rotated in the state in which the pen tip Ps of the pen P and the workpiece 20 are in contact with each other, the angle threshold value is a maximum angle at which it is possible to suppress the ink of the pen P from seeping into the workpiece 20, a maximum angle at which it is possible to suppress the workpiece 20 from becoming damaged due to friction between the pen tip Ps and the workpiece 20, or a maximum angle at which it is possible to suppress the occurrence of an accumulation of ink on the workpiece 20. The angle threshold value is stored in the flash memory 74.

When it is determined that the angle difference is larger than the angle threshold value (yes at S19), the controller 71 advances the processing to S12, and moves the pen P to the raised position. When it is determined that the angle difference is equal to or less than the angle threshold value (no at S19), the controller 71 advances the processing to S13, and rotates the pen P to the start angle position of the next line segment.

When it is determined that the line segment data of the next line segment is not present (no at S15), in a similar manner to the processing at S12, the controller 71 drives the Z-axis motor 34 and moves the cartridge 4 and the pen P to the raised position (step S20). In FIG. 4, when the preceding line segment is the line segment L4, the line segment data of the next line segment is not present, and thus, the processing at S20 is performed.

When the pen P is moved to the raised position, the controller 71 ends the cartridge movement processing, and returns the processing to the drawing mode processing.

Drawing Processing

The drawing processing will be described in detail with reference to FIG. 7. When the drawing processing is started, the controller 71 determines whether or not the vertical position in the acquired line segment data is "Down" (step S31).

When it is determined that the vertical position is "Down" (yes at S31), the controller 71 drives the Z-axis motor 34 and moves the cartridge 4 and the pen P to the lowered position (step S32). In the case of the line segment L1 shown in FIG. 4, the vertical position is "Down," and thus the controller 71 performs the processing at S32. Since the line segment L1 is the first line segment included in the data table 740, the controller 71 drives the Y-axis motor 15 and the X-axis motor 25, and, after relatively moving the cartridge 4 and the pen P to the start coordinates, moves the cartridge 4 and the pen P to the lowered position. In the relative movement of the cartridge 4 and the pen P to the start coordinates, as shown in FIG. 1, the conveyance portion 7 conveys the holder 10 holding the workpiece 20 in the Y direction that is the front-rear direction, and the movement portion 8 moves the cartridge 4 mounted to the mount portion 32 in the X direction that is the left-right direction. A portion on the outer right of the holder 10 is clamped between the drive roller 12 and the roller portion 131, and a portion on the outer left of the holder 10 is clamped between the drive roller 12 and a left roller portion (not shown in the drawings) of the pinch roller 13, respectively, and the conveyance portion 7 drives the Y-axis motor 15 in a forward or reverse direction. A rotational movement of the Y-axis motor 15 is transmitted to the drive roller 12, and the holder 10 is conveyed to the rear or to the front. The movement portion 8 transmits a rotational movement, which is a forward driving or a reverse driving of the X-axis motor 25, to the timing belt, via the drive gear 27, the driven gear 29, and the timing pulley 28. In this way, the mount portion 32 is moved to the left or to the right. In the case of the line segments L2 and L4 shown in FIG. 4, the controller 71 moves the cartridge 4 and the pen P to the lowered position without performing the control to move the cartridge 4 and the pen P to the start coordinates.

When the pen P is moved to the lowered position, the controller 71 determines whether or not the start angle position and the end angle position of the line segment to be drawn match each other (S33). For example, in the case of the line segment L1 shown in FIG. 4, the controller 71 determines whether the start angle position of 45° and the end angle position of 45° match each other.

When it is determined that the start angle position and the end angle position match each other (yes at S33), the controller 71 drives the Y-axis motor 15 and the X-axis motor 25, and relatively moves the pen P and the workpiece 20 (S34). In other words, the drawing device 1A draws the line segment on the workpiece 20. For example, the line segments L1, L2, and L4 shown in FIG. 4 are drawn by the processing at S34. In other words, in the state in which the pen P and the workpiece 20 are in contact with each other, the pen P is moved from the start coordinates to the end coordinates with respect to the workpiece 20, and the line segments L1, L2, and L4 are drawn. During a period in which the line segments L1, L2, and L4 are drawn, the controller 71 controls the driving of the rotation motor 38 and holds the mount portion 32 at the start angle position, such that the rotation angle position of the cartridge 4 and the pen P is fixed at the start angle position.

When it is determined that the vertical position is not "Down" (no at S31), that is, that the vertical position is "Up," the controller 71 drives the Z-axis motor 34 and moves the cartridge 4 and the pen P to the raised position (S35). In the case of the line segment L3 shown in FIG. 4, the vertical position is "Up," and since this is not "Down," the controller 71 performs processing at S35.

When the pen P is moved to the raised position, in a similar manner to the processing at S34, the controller 71 drives the Y-axis motor 15 and the X-axis motor 25 and relatively moves the pen P and the workpiece 20 (S36). For example, the line segment L3 shown in FIG. 4 is processed by the processing at S36. In other words, the rotation angle position of the cartridge 4 and the pen P is fixed at the start angle position, and the pen P is moved from the start coordinates to the end coordinates with respect to the workpiece 20 in the state in which the pen P and the workpiece 20 are separated from each other.

Figure 8:
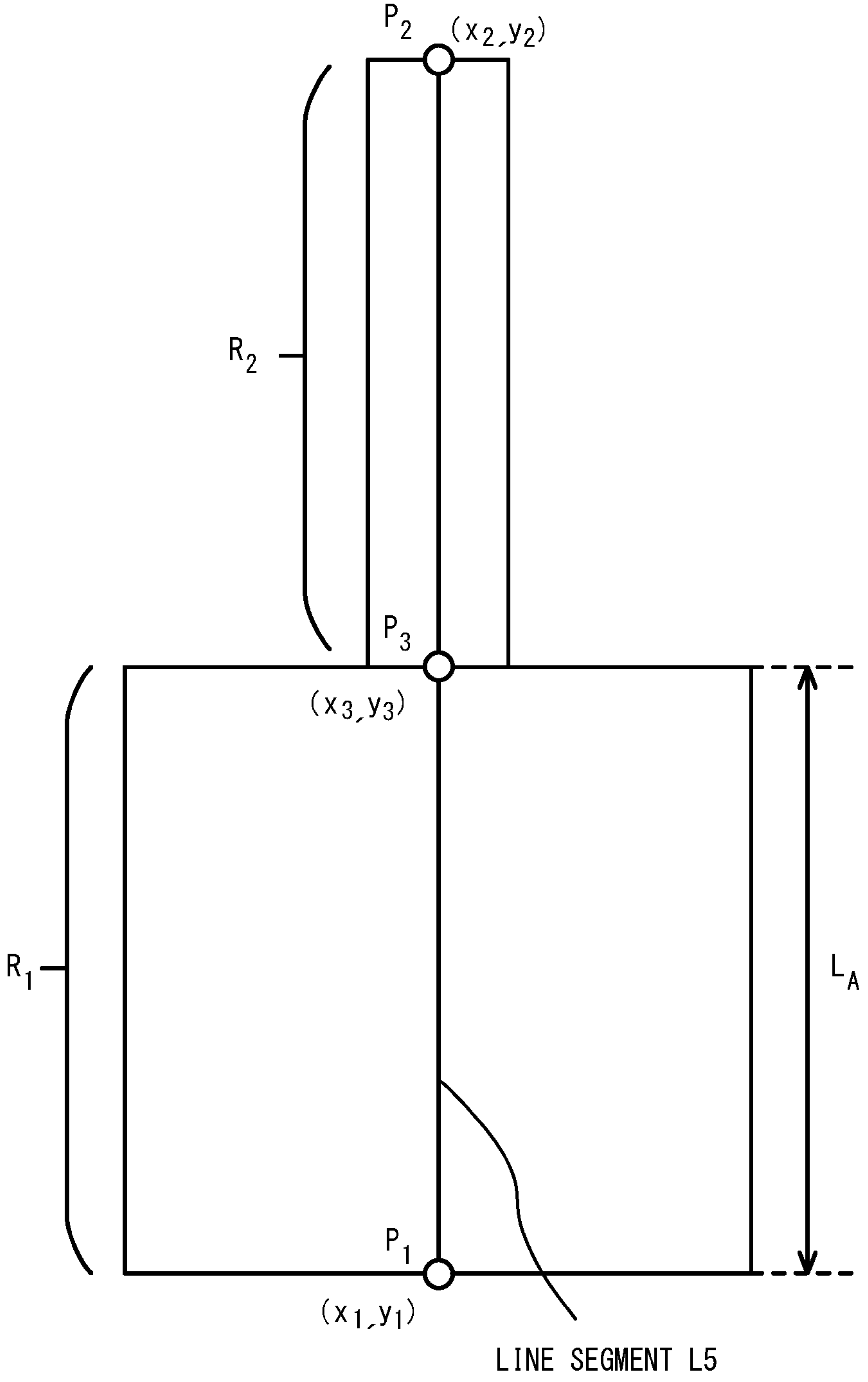
FIG. 8 is a diagram showing a midpoint division of a line segment.

When it is determined that the start angle position and the end angle position do not match each other (no at S33), the controller 71 calculates division coordinates between the start coordinates and the end coordinates of the line segment, and stores the division coordinates in the RAM 73 (S37). In the data table 740 shown in FIG. 4, since the processing from S37 to S41 is not performed, the drawing of the line segment L5 shown in FIG. 8 to FIG. 11 will be described as another example in which the processing at S37 to S41 is performed. In FIG. 8 to FIG. 11, a trajectory of the line segment L5 to be drawn by the pen P is indicated by a plurality of rectangles. During a period in which those rectangles are drawn, the pen P is respectively fixed at rotation angle positions $R_1$ to $R_{10}$ noted to the left side of the plurality of rectangles, and the line segment L5 is drawn. As shown in FIG. 8, in the line segment L5 specified by a start point $P_1$ and an end point $P_2$, the start angle position $R_1$ and the end angle position $R_2$ are rotation angle positions that differ from each other, and thus, the division coordinates of a division point $P_3$ $(x_3, y_3)$ between start coordinates of the start point $P_1$ $(x_1, y_1)$ and end coordinates of the end point $P_2$ $(x_2, y_2)$ are calculated. More specifically, the division coordinates of the division point $P_3$ $(x_3, y_3)$ are calculated using a midpoint division, as shown by the following Formulas (1) and (2).

$$x_3=(x_1+x_2)/2 \tag{1}$$

$$y_3=(y_1+y_2)/2 \tag{2}$$

When the division coordinates are stored, the controller 71 calculates a length $L_A$ of a line segment portion specified by the start coordinates and the division coordinates, and stores the length $L_A$ in the RAM 73 (S38). In other words, as shown in FIG. 8, the length $L_A$ of the line segment portion between the start point $P_1$ and the division point $P_3$ is calculated using the following Formula (3).

$$L_A=\{(x_3-x_1)^2+(y_3-y_1)^2\}^{1/2} \tag{3}$$

Figure 11:
FIG. 11 is a diagram showing the line segment to be drawn.

When the length $L_A$ is stored, the controller 71 determines whether or not the length $L_A$ of the line segment portion specified by the start coordinates and the division coordinates is larger than a length threshold value (S39). The length threshold value of the line segment portion is a maximum length with which it is possible for a person to visually recognize that a contour of the drawn line segment L5 changes smoothly, as shown in FIG. 11. The length threshold value is stored in the flash memory 74.

Figure 9:
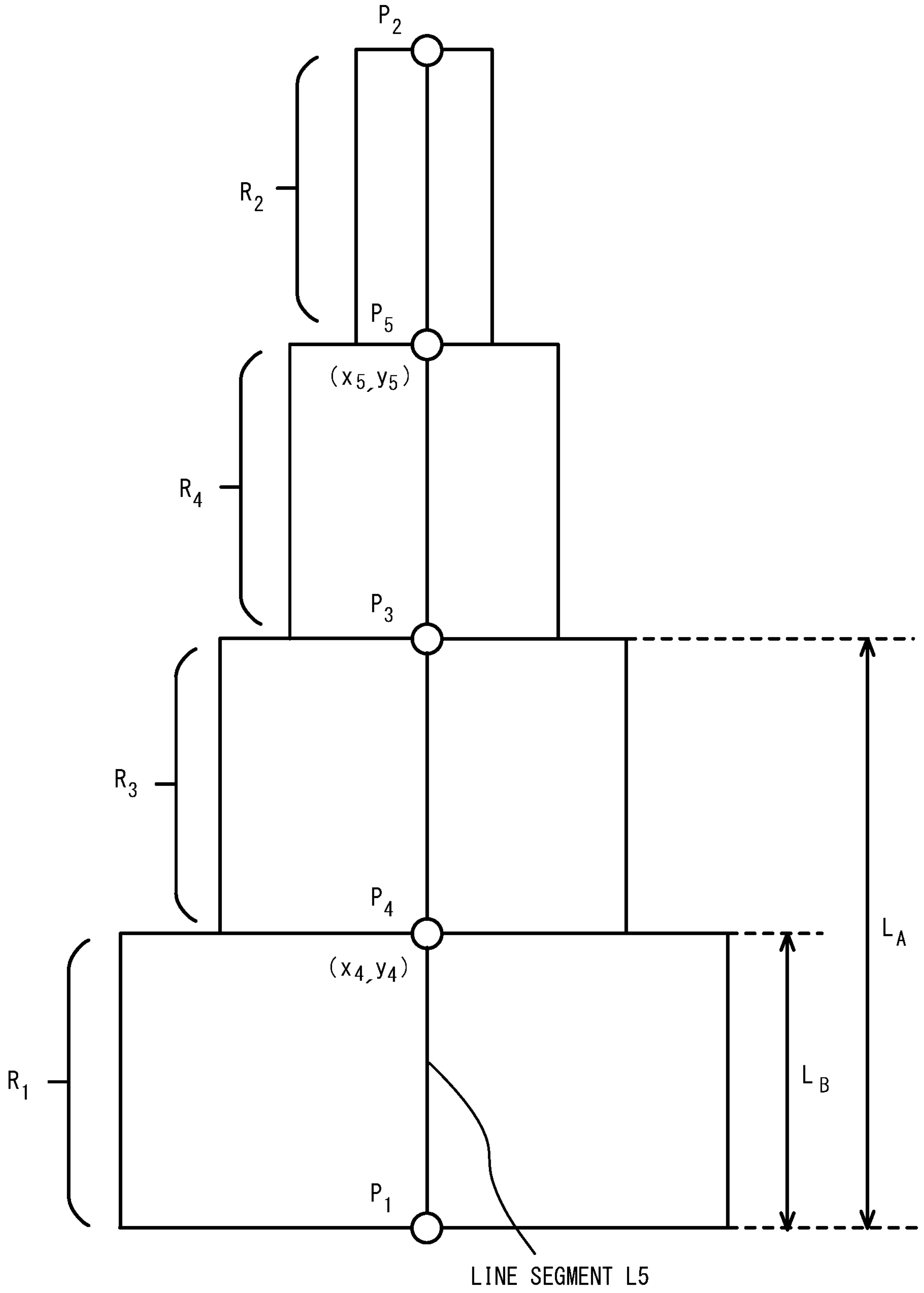
FIG. 9 is a diagram showing a four-part equidistant division of the line segment.

When it is determined that the length $L_A$ is larger than the length threshold value (yes at S39), the controller 71 calculates the division angle positions $R_3$ and $R_4$ between the start angle position and the end angle position of the line segment, and stores the division angle positions $R_3$ and $R_4$ in the RAM 73 (S40). In other words, as shown in FIG. 9, the division angle positions $R_3$ and $R_4$, which divide an angle between the start angle position $R_1$ and the end angle position $R_3$ into three equal sections, are calculated. More specifically, the division angle position $R_3$ is calculated by subtracting, from the start angle position $R_1$, a value that divides the angle between the start angle position $R_1$ and the end angle position $R_2$ into the three equal sections, as shown by the following Formula (4). The division angle position $R_4$ is calculated by subtracting, from the division angle position $R_3$, the value that divides the angle between the start angle position $R_1$ and the end angle position $R_2$ into the three equal sections, as shown by the following Formula (5).

$$R_3 = R_1 - (R_1 - R_2)/3 = (2R_1 + R_2)/3 \quad (4)$$

$$R_4 = R_3 - (R_1 - R_2)/3 = (R_1 + 2R_2)/3 \quad (5)$$

When the division angle positions $R_3$ and $R_4$ are stored, the controller 71 returns the processing to S37 and performs processing at S37 to S39.

When the length $L_A$ of the line segment portion in the line segment L5 is larger than the length threshold value, as shown in FIG. 9, at S37, the controller 71 calculates three division points $P_3$ to $P_5$ that divide the line segment between the start point $P_1$ and the end point $P_2$ into four equal portions. In other words, the division coordinates of the division point $P_4$ ($x_4$, $y_4$), which divides the line segment at a midpoint between the start point $P_1$ and the previously calculated division point $P_3$, are calculated. The division coordinates of the division point $P_5$ ($x_5$, $y_5$), which divides the line segment at a midpoint between the division point $P_3$ and the end point $P_2$, are calculated. At S38, a length $L_B$ between the start point $P_1$ and the division point $P_4$ is calculated. At S39, it is determined whether or not the length $L_B$ is larger than the length threshold value.

Figure 10:
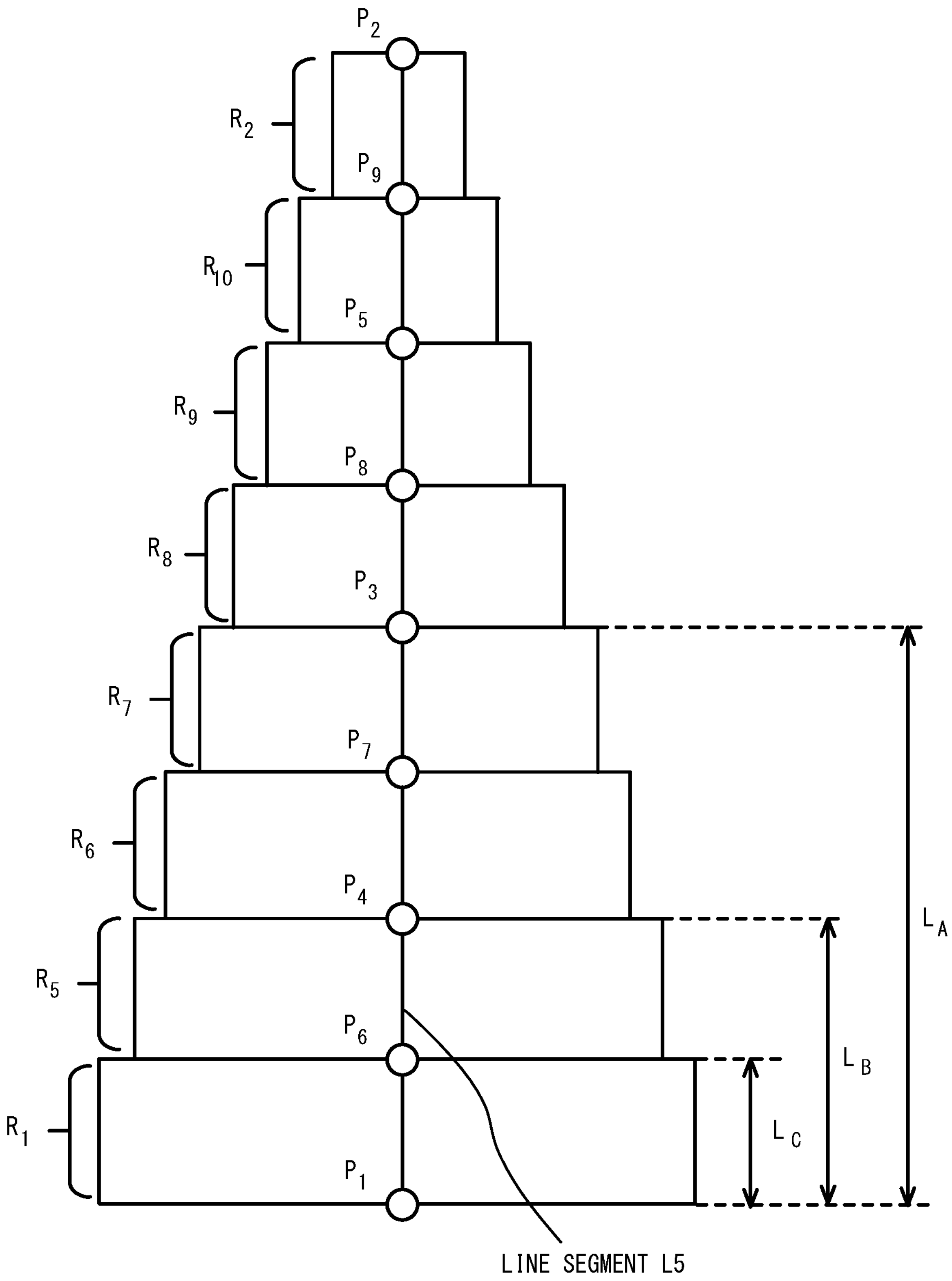
FIG. 10 is a diagram showing a n eight-part equidistant division of the line segment.

When it is determined that the length $L_B$ is larger than the length threshold value (yes at S39), the controller 71 once more performs the processing at S40, and at S37 to S39. In other words, as shown in FIG. 10, at S40, the division angle positions $R_5$ to $R_{10}$, which divide the angle between the start angle position $R_1$ and the end angle position $R_2$ into seven equal sections over the line segment L5, are calculated. At S37, seven division points $P_3$ to $P_9$, which divide the line segment between the start point $P_1$ and the end point $P_2$ into eight equal portions, are calculated. In other words, the division coordinates of the division points $P_6$ to $P_9$ are calculated, which respectively divide the line segments at midpoints between the start point $P_1$ and the previously calculated division point $P_4$, between the division point $P_4$ and the previously calculated division point $P_3$, between the division point $P_3$ and the previously calculated division point $P_5$, and between the division point $P_5$ and the end point $P_2$. At S38, a length $L_C$ between the start point $P_1$ and the division point $P_6$ is calculated. At S39, it is determined whether or not the length $L_C$ is larger than the length threshold value.

When it is determined that the length $L_C$ is larger than the length threshold value (yes at S39), the controller 71 once more performs the processing at S40, and at S37 to S39. When the processing at S40 and at S37 to S39 is repeated N times (N is an integer of two or more), at S40, the division angle positions are calculated so as to divide the angle between the start angle position $R_1$ and the end angle position $R_2$ into ($2^N-1$) sections. At S37, the division coordinates are calculated so as to divide the line segment between the start point $P_1$ and the end point $P_2$ into $2^N$ equal portions. At S38, a length between the start point $P_1$ and the division point closest to the start point $P_1$ is calculated. At S39, it is determined whether or not that length is larger than the length threshold value.

When it is determined that the calculated length is not larger than the length threshold value (no at S39), that is, when it is determined that the calculated length is equal to or less than the threshold value, while rotating the pen P on the division coordinates, the controller 71 drives the Y-axis motor 15 and the X-axis motor 25 and relatively moves the pen P and the workpiece 20 (S41). An example will be described in which the line segment L5 is drawn via the division points $P_3$ to $P_9$ and the division angle positions $R_5$ to $R_{10}$ shown in FIG. 10. By the same processing as at S34, in a state in which the pen P is held at the start angle position $R_1$, the pen P is moved relative to the workpiece 20 from the start point $P_1$ to the division point $P_6$. After that, on the division point $P_6$, in the state in which the pen P is in contact with the workpiece 20, the pen P is rotated from the start angle position $R_1$ to the division angle position $R_5$. After that, once more, by the same processing as at S34, the pen P is moved relative to the workpiece 20 from the division point $P_6$ to the division point $P_4$, and, on the division point $P_4$, the pen P is rotated from the division angle position $R_5$ to the division angle position $R_6$. Subsequently, the same processing is repeatedly performed until the end point $P_2$ is reached, and, as shown in FIG. 11, it is possible to draw the line segment for which the line width becomes smoothly smaller from the start point $P_1$ toward the end point $P_2$.

When the pen P and the workpiece 20 are moved relative to each other by the processing at S34, S36, or S41, the controller 71 ends the drawing processing at S14, and returns the processing to the cartridge movement processing at S6.

Drawing of Object Using Calligraphy

Figure 12:
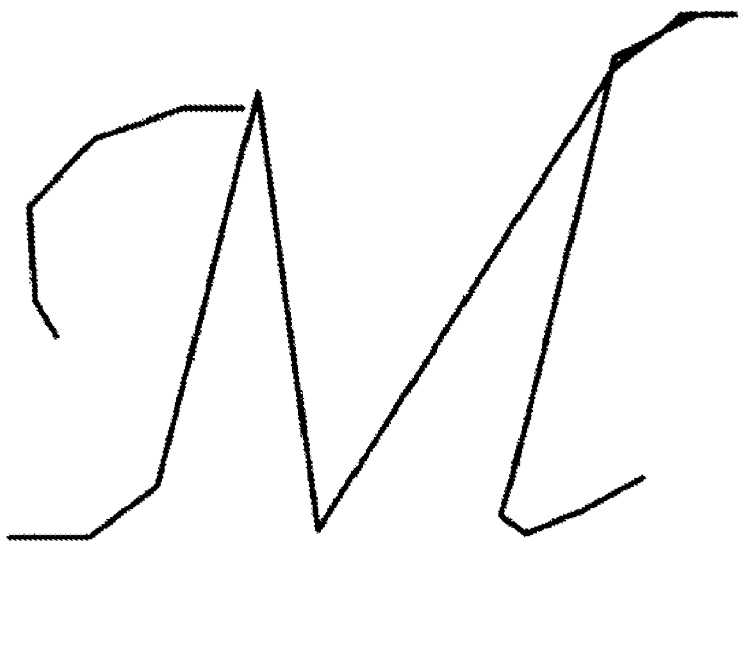
FIG. 12 is a diagram showing a plurality of line segments configuring a character "M" to be drawn in an italic font using calligraphy.
Figure 13:
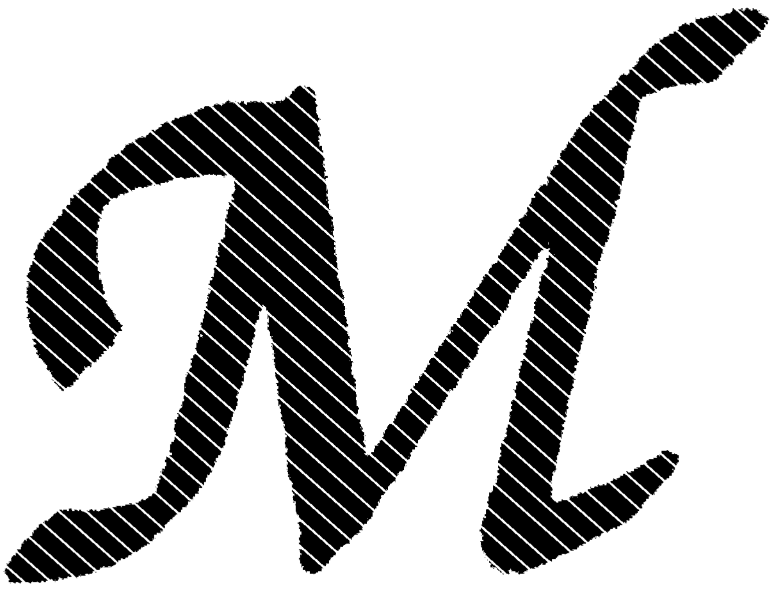
FIG. 13 is a diagram showing the character "M" to be drawn in the italic font using calligraphy.

In the description of the above-described drawing mode processing, a case is described in which the character "A" is drawn using the italic font, using the data table 740 shown in FIG. 4 as an example. Further, when the character "M" of the italic font is set in the drawing device 1A, as shown in FIG. 12, the cartridge movement processing at S6 and the drawing processing at S14 are performed for a plurality of the line segments configuring the character "M." Then, the object of the character "M" of the italic font shown in FIG. 13 is drawn on the workpiece 20.

Effects of Present Embodiment

When the end angle position of the preceding line segment and the start angle position of the next line segment differ from each other, by the processing at S13 and S17, the pen P is rotated per line segment. Thus, compared to a case in which a pen is not rotated during the drawing of a single object, the line width of the drawn object changes, and a power of expression of the drawn object is improved.

When the angle difference is larger than the angle threshold value, by the processing at S19 and S12, the pen P is rotated in the state in which the pen P and the workpiece 20 are separated from each other, and thus, it is possible to inhibit the ink of the pen P from seeping into the workpiece 20. Further, it is possible to inhibit the workpiece 20 from being damaged by the friction between the pen P and the workpiece 20. In addition, it is possible to inhibit the occurrence of an accumulation of ink on the workpiece 20.

When the angle difference is equal to or less than the angle threshold value, in the processing at S19 and S13, even if the pen P is rotated in the state of the pen P and the workpiece 20 being in contact with each other, there is a low risk of the seeping of the ink into the workpiece 20, of the damage to the workpiece 20, and of the occurrence of the accumulation of ink. Thus, since the pen P is rotated in the state in which the pen P and the workpiece 20 are in contact with each other, compared to a case in which the pen P and the workpiece 20 are caused to separate from each other each time the pen P is rotated, a time period to move from the preceding line segment to the next line segment can be shortened.

By the processing at S34 and S41, there is a case in which the line segment is drawn while controlling the operation of the rotation portion 36 such that the rotation angle position of the cartridge 4 and the pen P is changed, and there is a case in which the line segment is drawn while the rotation angle position of the cartridge 4 and the pen P is fixed as it is. Thus, the power of expression of the drawn object is improved.

By the processing at S37 to S40, for the line segment, the division coordinates and the division angle positions are calculated such that the length between the start coordinates and the division coordinates of the line segment is equal to or less than the length threshold value, and by the processing at S41, the line segment is drawn while rotating the pen P on the division coordinates. It is thus possible to draw the line segment in which a person can visually recognize that the contour of the line segment changes smoothly, and, as a result, the power of expression of the drawn object is improved.

As shown in FIG. 4, the rotation direction of the pen P when drawing each of the line segments is specified to be one of the rightward rotation or the leftward rotation. Thus, in comparison to a case in which the pen P is always rotated in one direction, a time period to change the rotation angle position of the cartridge 4 and the pen P can be shortened.

As shown in FIG. 4, in the plurality of line segments L1 to L4 configuring the character "A," the start coordinates, the end coordinates, the start angle position, and the end angle position are set per line segment, and thus, the power of expression of the drawn character is improved.

Modified Examples

While the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described disclosure are provided below:

(1) In the present embodiment, as shown in FIG. 1, the configuration is adopted in which the pen P is held by the cartridge 4, and the cartridge 4 is mounted to the carriage 19, but the carriage 19 may directly hold the pen P such that the pen P can rotate. Further, the configuration is adopted in which the rotation portion 36 rotates the cartridge 4, but the rotation portion 36 may rotate the carriage 19 and the cartridge 4. Further, when the pen P is directly held by the carriage 19, the rotation portion 36 may rotate the carriage 19.

(2) In the present embodiment, the configuration is adopted in which the cartridge 4 and the pen P are rotated by the rotation of the rotation motor 38, around the center line M, which is parallel to the up-down direction, of the cartridge 4 as the rotational axis. However, the cartridge 4 and the pen P may be rotated around a rotational axis that is an axis parallel to the up-down direction and that is different from the center line M of the cartridge 4.

(3) In the present embodiment, as shown in FIG. 1, the configuration is adopted in which the conveyance portion 7 conveys the workpiece 20 in the Y direction that is the front-rear direction, and the movement portion 8 moves the pen P in the X direction that is the left-right direction. However, the movement portion 8 may move the pen P in the X direction and the Y direction. Further, the conveyance portion 7 may convey the workpiece 20 in the X direction and the Y direction. In addition, in the present embodiment, the X direction is the left-right direction, the Y direction is the front-rear direction, and the Z direction is the up-down direction, but each of the directions may be switched such that the X direction may be the up-down direction, the Y direction may be the left-right direction, and the Z direction may be the front-rear direction. In either case, the pen P and the workpiece 20 can be moved relative to each other in the X direction and the Y direction.

(4) In the present embodiment, as shown in FIG. 4, the single character, namely the character "A," is drawn, but a plurality of characters, such as "ABCD" may be continuously drawn. In other words, as shown in FIG. 5, a plurality of the characters may be selected before the processing at S1, or, after drawing the single character by the processing at S6, the next character may be selected, and the next character may be drawn.

(5) In the present embodiment, as shown in FIG. 4, the processing is shown in which the character "A" is drawn, but when the symbol or the pattern is to be drawn, the processing at S6 may be performed. Even in the case of the symbol or the pattern, the processing at S6 that is the same as that for the character can be performed by including the drawing data and the angle data for each of the line segments in a data table, as with the data table 740. Further, in FIG. 4, the font type is specified as being the italic font, but a font other than the italic font, such as a gothic font, a copperplate font, or the like, may be specified.

(6) In the present embodiment, as shown in FIG. 4, in the angle data of each of the line segments L1 to L4, the start angle position and the end angle position are set, but the rotation angle positions may be respectively set at two specific positions that are separated on the line segment. The two specific position may be the start point, and a position on the line segment other than the start point and the end point, may be the end point and a position on the line segment other than the start point and the end point, or may be two positions that are separated on the line segment other than the start point and the end point. In any of these cases, by setting the rotation angle of the two positions separated on the line segment, when drawing that line segment, it is possible to determine whether or not to draw the line segment while smoothly changing the line width.

(7) In the present embodiment, as shown in FIG. 4, the drawing data of each of the line segments L1 to L4 is the data representing each of the line segments using absolute coordinates, but the drawing data may be data representing each of the line segments using vectors. Specifically, the drawing data may be represented by a start position of the vector, a length of the vector, and a direction of the vector. In other words, it is sufficient that the drawing data be data relating to the position and length of the line segment. Further, the angle data may be represented by a conduction time period to a motor, or by a number of pulse waveforms transmitted to the motor, or the like. In other words, it is sufficient that angle data be data relating to the rotation angle.

(8) In the present embodiment, as shown in FIG. 4, the rotation of the cartridge 4 and the pen P is specified using the rotation angle position that is the absolute value, but the rotation may be specified using a relative angle. In other words, in the line segment L1, a start angle may be specified as 45° that is the angle difference from 0° that is the origin position, and the end angle may be specified as 0° that is not changed from the start angle. In this case, in the processing at S17, it may be determined whether or not the start angle of the next line segment is 0°. Further, the processing at S18 need not necessarily be performed, and in the processing at S19, it may be determined whether or not the start angle is larger than the angle threshold value. In this case, the angle value may correspond to the start angle of the next line segment and may be acquired by the processing at S16.

(9) In the present embodiment, as shown in FIG. 6, by the processing at S12, S13, and S19, based on a magnitude correlation between the calculated angle difference and the angle threshold value, the processing is either performed in a case in which the pen P is rotated at the raised position, or in a case in which the pen P is rotated at the lowered position. However, the pen P may always be rotated at the raised position, regardless of the magnitude correlation between the calculated angle difference and the angle threshold value. In this case, it is possible to inhibit the ink of the pen P from seeping into the workpiece 20, to inhibit the workpiece 20 from being damaged by the friction between the pen P and the workpiece 20, or to inhibit the occurrence of the accumulation of ink on the workpiece 20, resulting from the rotation of the pen P. Further, the pen P may always be rotated at the lowered position. In this case, compared to a case in which the pen P is moved to the raised position each time the pen P is rotated, the time period to move from the preceding line segment to the next line segment can be shortened.

(10) In the present embodiment, as shown in FIG. 7, in the processing at S34, the controller 71 controls the driving of the rotation motor 38 such that the rotation angle position of the cartridge 4 and the pen P is fixed at the start angle position, but the controller 71 need not necessarily perform any control. In this case, since the rotation motor 38 does not rotate, the cartridge 4 and the pen P can be suppressed from rotating.

(11) In the present embodiment, as shown in FIG. 7, at S37, the division coordinates are calculated using the midpoint division, but the division coordinates may be calculated using division into three equal portions, division into four equal portions, or the like. In this case, between S33 and S37, a length of the line segment identified using the start point and the end point may be divided by the length threshold value, processing may be performed to determine how many equal portions to divide the line segment into, and the processing at S39 need not necessarily be performed. Since the length of the line segment is divided by the length threshold value and it is thus determined how many equal portions to divide the line segment into, it is not necessary to repeatedly perform the processing at S37 to S40 shown in FIG. 7, and steps can thus be omitted. As a result, programs are suppressed from becoming complex.

(12) In the present embodiment, as shown in FIG. 7, it is possible to draw the line segment whose contour changes smoothly, by respectively calculating the division coordinates and the division angle positions by the processing at S37 and S40. However, a rotation speed of the rotation portion 36 may be calculated from a conveyance speed of the conveyance portion 7 or a movement speed of the movement portion 8, without calculating the division coordinates and the division angle positions. For example, in the line segment L5 shown in FIG. 8, when the movement speed of the movement portion 8 is $v_x$, using the following Formulas (6) and (7), a drawing time period t, and a conveyance speed $v_y$ of the conveyance portion 7 are calculated.

$$t=(x_2-x_1)/v_x \quad (6)$$

$$v_y=(y_2-y_1)/t \quad (7)$$

A rotation speed $v_R$ of the rotation portion 36 is calculated using the following Formula (8), based on the drawing time period t, the start angle position $R_1$, and the end angle position $R_2$.

$$v_R=(R_2-R_1)/t \quad (8)$$

The drawing device 1A rotates the pen P at the rotation speed $v_R$ while causing the conveyance portion 7 to perform the conveyance at the conveyance speed $v_y$, and causing the movement portion 8 to move at the movement speed $v_x$, and can thus draw the line segment whose contour changes smoothly. As a result, the power of expression of the drawn object improves.

(13) In the present embodiment, as shown in FIG. 7, in the processing at S38 and S39, the length of the line segment between the start coordinates and the division coordinates is calculated and that length is compared to the length threshold value. However, the length may be the length between the start coordinates and the end coordinates, and the length threshold value may be set as a value corresponding to the length between the start coordinates and the end coordinates.

(14) In the present embodiment, the configuration is adopted in which the flash memory 74 stores the plurality of data tables, but a configuration may be adopted in which a memory that can be attached to and detached from the drawing device 1A stores the plurality of data tables. When the detachable memory is used, a temporary storage memory, such as the RAM 73, provided in the drawing device 1A stores at least one of the data tables that has been selected.

What is claimed is:

1. A drawing device that draws an object on a workpiece using a pen, the drawing device comprising:
- a holder configured to hold the pen;
- a first movement portion configured to move the holder and the workpiece relative to each other in an X direction and a Y direction that are mutually orthogonal;
- a rotation portion configured to rotate the holder around a rotational axis parallel to a Z direction orthogonal to the X direction and the Y direction;
- a processor; and
- a memory storing, for each of a plurality of line segments configuring the object, drawing data relating to a position of the line segment and to a length of the line segment, and angle data relating to a rotation angle of the holder, the rotation angle corresponding to a line width of the line segment, and the memory storing computer-readable instructions that, when executed by the processor, cause the processor to perform processes comprising:
  - first acquiring of acquiring, from the memory, the drawing data and the angle data of a preceding line segment;

first rotating of rotating the rotation portion, in accordance with the angle data of the preceding line segment acquired by the first acquiring;

first drawing of controlling the first movement portion to draw on the workpiece using the pen, in accordance with the drawing data of the preceding line segment acquired by the first acquiring;

second acquiring of acquiring, from the memory, the drawing data and angle data of a subsequent line segment continuously subsequent to the preceding line segment;

second rotating of rotating the rotation portion in accordance with the angle data of the subsequent line segment acquired by the second acquiring; and second drawing of controlling the first movement portion to draw on the workpiece using the pen, in accordance with the drawing data of the subsequent line segment acquired by the second acquiring.

2. The drawing device according to claim 1, wherein the computer-readable instructions instruct the processor to perform the first drawing after the first rotating, and to perform the second drawing after the second rotating.

3. The drawing device according to claim 1, further comprising:

a second movement portion coupled to the holder, and configured to move the holder in the Z direction, wherein when, after the first drawing, the rotation angle corresponding to the line width of the preceding line segment and the rotation angle corresponding to the line width of the subsequent line segment are different to each other, the computer-readable instructions instruct the processor to control the second movement portion, before the second rotating, to perform separating of displacing the holder to a separated position at which the pen and the workpiece are separated from each other.

4. The drawing device according to claim 3, wherein the computer-readable instructions further instruct the processor to perform a process comprising:

third acquiring of acquiring an angle value that changes the rotation angle of the holder from the rotation angle corresponding to the line width of the preceding line segment to the rotation angle corresponding to the line width of the subsequent line segment, and when the rotation angle corresponding to the line width of the preceding line segment and the rotation angle corresponding to the line width of the subsequent line segment are different to each other, the computer-readable instructions instruct the processor to perform the second rotating after the separating, when the angle value is larger than an angle threshold value, and perform the second rotating without performing the separating, when the angle value is equal to or less than the angle threshold value.

5. The drawing device according to claim 1, wherein the angle data of the line segment includes a first rotation angle and a second rotation angle, which are the rotation angles of the holder at two specific positions separated from each other on the line segment, the first drawing and the second drawing respectively include rotating drawing and fixed drawing, the rotating drawing controlling the first movement portion while controlling the rotation portion to rotate the holder, and the fixed drawing controlling the first movement portion without rotating the holder, and the computer-readable instructions instruct the processor to perform the rotating drawing when the first rotation angle and the second rotation angle are different to each other, and perform the fixed drawing when the first rotation angle and the second rotation angle are the same as each other.

6. The drawing device according to claim 5, wherein the computer-readable instructions further instruct the processor to perform processes comprising:

first calculating of calculating a position of a division point dividing the line segment into a plurality of portions; and second calculating of calculating a division angle dividing an angle between the first rotation angle and the second rotation angle into a plurality of sections, the drawing data of the line segment includes a position of a start point and a position of an end point on the line segment, as the two specific positions separated from each other on the line segment, the first rotation angle is the rotation angle of the holder at the start point, the second rotation angle is the rotation angle of the holder at the end point, the rotating drawing includes first rotating drawing and second rotating drawing, the first rotating drawing controlling the first movement portion while controlling the rotation portion to rotate the holder, in accordance with the position of the start point, the position of the end point, the first rotation angle, the second rotation angle, the position of the division point, and the division angle, and the second drawing controlling the first movement portion while controlling the rotation portion to rotate the holder, in accordance with the position of the start point, the position of the end point, the first rotation angle, the second rotation angle, and the position of the division point, and the computer-readable instructions instruct the processor to perform the first calculating, the second calculating and the first rotating drawing, without performing the second rotating drawing, when the length of the line segment is larger than a length threshold value, and perform the first calculating and the second rotating drawing, without performing the first rotating drawing, when the length of the line segment is equal to or less than the length threshold value.

7. The drawing device according to claim 6, wherein when the length of the line segment is larger than the length threshold value, the first calculating calculates a position of a first division point, a position of a second division point, and a position of a third division point, the first division point being a point dividing the line segment at a midpoint between the position of the start point and the position of the end point, the second division point being a point dividing the line segment at a midpoint between the position of the start point and the position of the first division point, and the third division point being a point dividing the line segment at a midpoint between the position of the first division point and the position of the end point, and the second calculating calculates a first division angle and a second division angle, by dividing the angle between the first rotation angle and the second rotation angle into the plurality of sections, the first division angle being an angle of the line segment from the position of the second division point to the position of the first division point, and the second division angle being an angle of the line segment from the position of the first division point to the position of the third division point, and the first rotating drawing includes moving the holder relative to the workpiece from the position of the start point to the position of the second division point, while fixing the holder at the first rotation angle, changing, at the position of the second division point, the rotation angle of the holder from the first rotation angle to the first division angle, moving the holder relative to the workpiece from the position of the second division point to the position of the first division point, while fixing the holder at the first division angle, changing, at the position of the first division point, the rotation angle of the holder from the first division angle to the second division angle, moving the holder relative to the workpiece from the position of the first division point to the position of the third division point, while fixing the holder at the second division angle, changing, at the position of the third division point, the rotation angle of the holder from the second division angle to the second rotation angle, and moving the holder relative to the workpiece from the position of the third division point to the position of the end point, while fixing the holder at the second rotation angle, and when the length of the line segment is equal to or less than the length threshold value, the first calculating calculates the position of the first division point, the first division point being the point dividing the line segment at the midpoint between the position of the start point and the position of the end point, and the second rotating drawing includes moving the holder relative to the workpiece from the position of the start point to the position of the first division point, while fixing the holder at the first rotation angle, changing, at the first division point, the rotation angle of the holder from the first rotation angle to the second rotation angle, and moving the holder relative to the workpiece from the position of the first division point to the position of the end point, while fixing the holder at the second rotation angle.

8. The drawing device according to claim 1, wherein the angle data includes a rotation direction in which the holder is to be rotated, and the rotation angle of the holder, and the first rotating and the second rotating include rotating the rotation portion in accordance with the rotation direction and the rotation angle of the angle data.

9. The drawing device according to claim 1, wherein the drawing data includes coordinates of a start point and coordinates of an end point per line segment, and as the rotation angle of the holder, the angle data is configured by rotation angle positions set using an origin point as a reference, and includes the rotation angle position of the holder at the start point of the line segment, and the rotation angle position of the holder at the end point of the line segment.

* * * * *